Oct. 17, 1933.  G. H. HORNE ET AL  1,930,806
APPARATUS FOR SEPARATING SUSPENDED PARTICLES FROM GASES
Filed Oct. 28, 1929    4 Sheets-Sheet 1
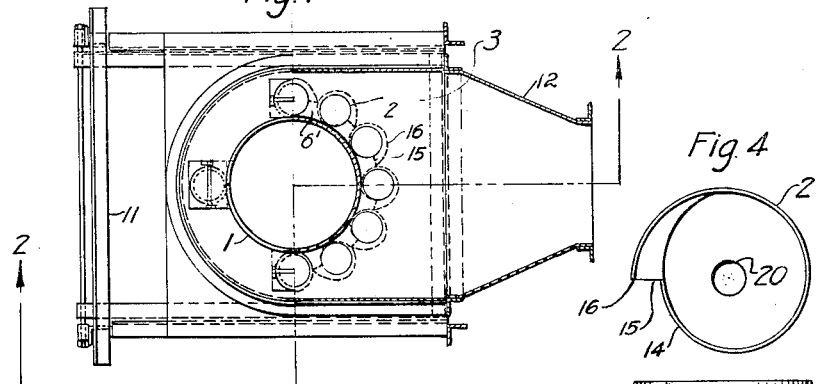
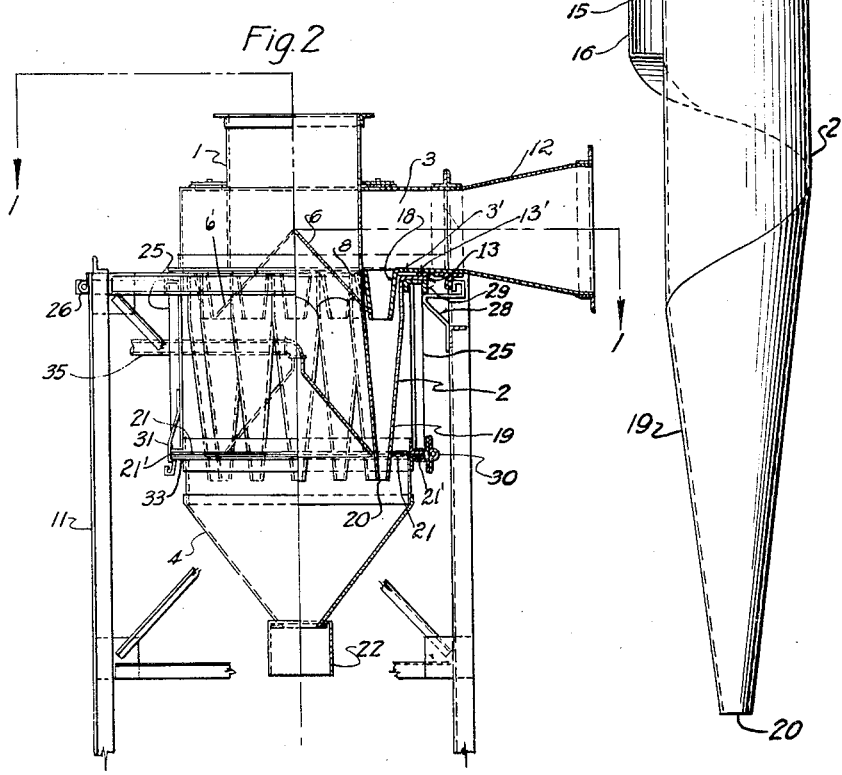
INVENTORS
George H. Horne
Marcel A. Lissman
BY
ATTORNEYS

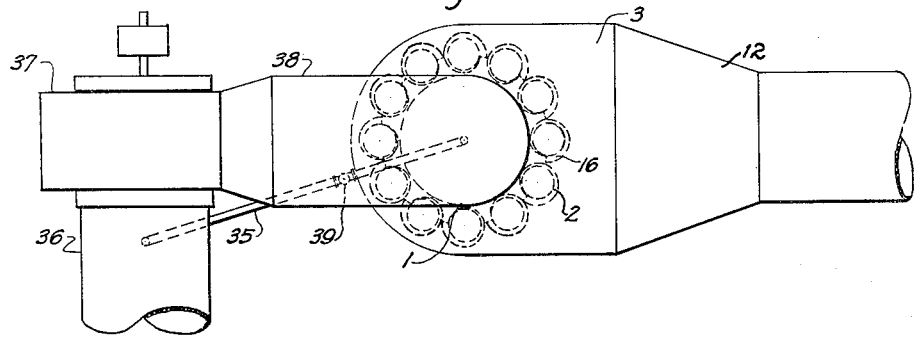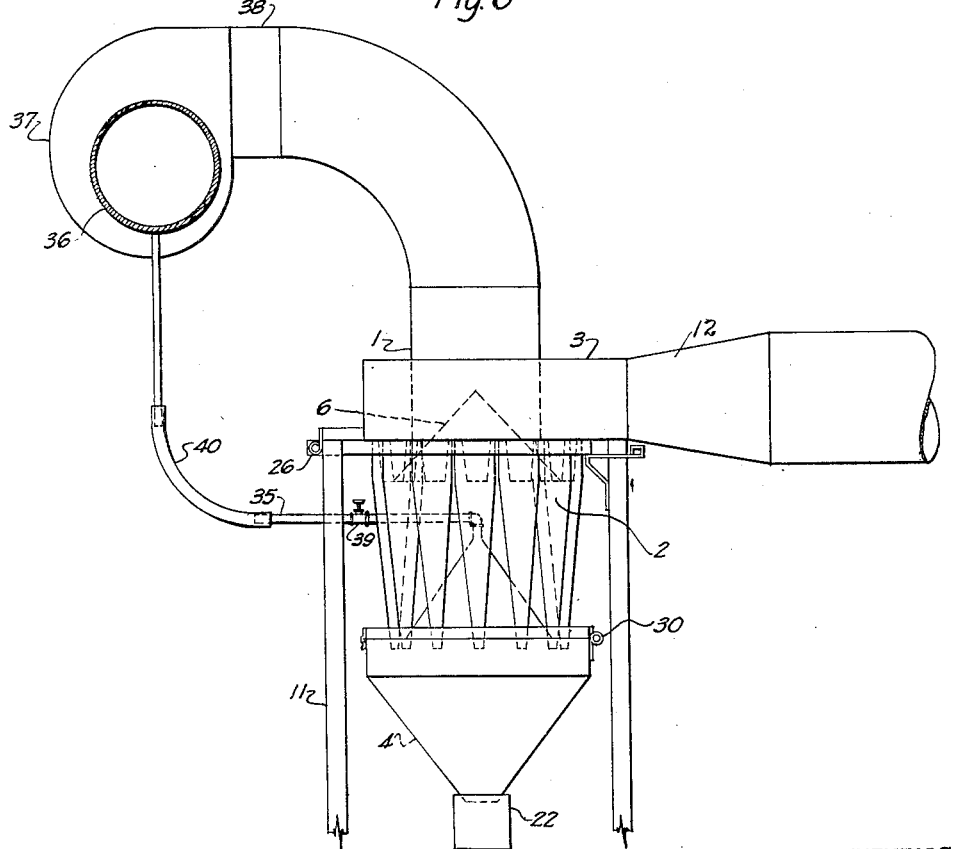

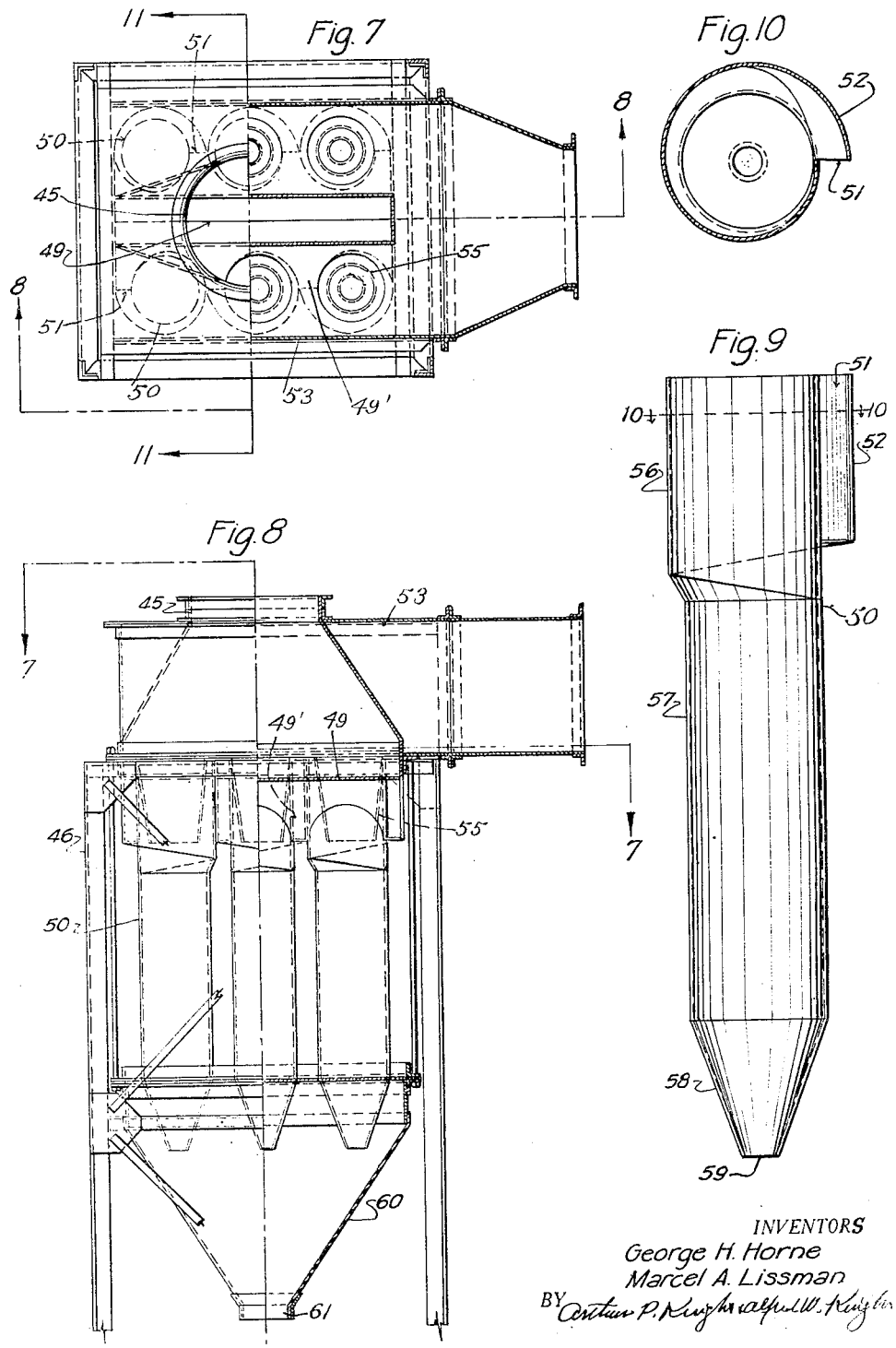

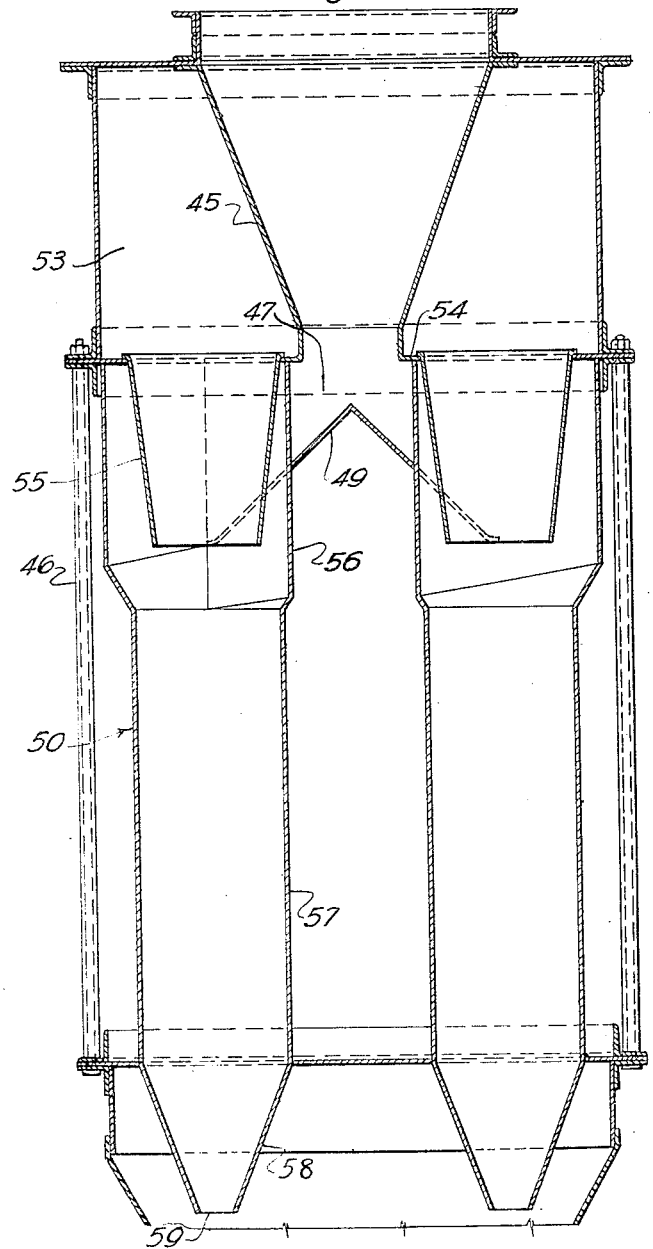

Patented Oct. 17, 1933

1,930,806

UNITED STATES PATENT OFFICE

1,930,806

APPARATUS FOR SEPARATING SUSPENDED PARTICLES FROM GASES

George H. Horne, Glendale, and Marcel A. Lissman, Los Angeles, Calif., assignors to International Precipitation Company, Los Angeles, Calif., a corporation of California Application October 28, 1929. Serial No. 403,004

7 Claims. (Cl. 183—83)

This invention relates to means for separating suspended particles from gases by centrifugal action. The main object of this invention is to provide for high efficiency of separation together with large capacity.

A further object of this invention is to provide for distribution of the gas being treated in the most effective manner to the separating elements of the apparatus. Another object of this invention is to provide for mounting the several parts of the apparatus in such manner as to facilitate cleaning same.

The accompanying drawings illustrate embodiments of our invention and referring thereto:

Fig. 1 is a partly sectional plan of the apparatus taken on line 1—1 in Fig. 2.

Fig. 2 is a partly sectional side elevation taken on line 2—2 in Fig. 1.

Fig. 3 is a side elevation of one of the separator units.

Fig. 4 is a plan view of Fig. 3.

Fig. 5 is a plan view of the separating apparatus assembled in connection with a blower or fan for producing the necessary draft through the apparatus.

Fig. 6 is a side elevation of the apparatus shown in Fig. 5.

Fig. 7 is a partly sectional plan of another form of the apparatus taken on line 7—7 in Fig. 8.

Fig. 8 is a partly sectional side elevation taken on line 8—8 in Fig. 7.

Fig. 9 is a side elevation of one of the separating units used in the apparatus shown in Figs. 7 and 8.

Fig. 10 is a section on line 10—10 in Fig. 9.

Fig. 11 is a vertical section on the line 11—11 in Fig. 7.

The form of our invention shown in Figs. 1 to 6 comprises an inlet header 1, a plurality or multiplicity of separator units 2, connected to said header, an outlet header 3 connected to receive the gas from said separator units, and means 4 for receiving the collected material from said separator units.

Inlet header 1 is preferably formed as a vertical tube through which the gases to be treated pass downward. A conical deflector 6 is mounted concentrically within the lower portion of said tube with its apex extending upwardly into the tube and with its lower end extending below and spaced from the bottom of the outlet header 3. The inlet header or tube 1 terminates sufficiently above the outer edge portion of the cone deflector 6 to provide therewith an annular passage or opening 8 through which the gas to be treated may pass to the several separator units. The outlet header 3 may be formed as a horizontal chamber surrounding the inlet header 1 and mounted on a suitable supporting frame 11, said outlet header opening at one side into the outlet flue 12 for conducting away the cleaned or treated gas.

The plurality or multiplicity of separator units are shown in this case as arranged in a circle around the axis of the tubular inlet header 1 and conical deflector 6, each separator unit comprising a vertical tubular member 14 connected at its upper end to suitable supporting means, for example, to a top plate 13 and having a lateral opening 15 arranged opposite the inlet passage or opening 8 aforesaid, between the lower end of the tubular inlet header 1 and the deflector cone 6 so as to permit the gases or vapors from the inlet tube to pass into the respective separator elements, the inlet opening 15 of each separator tube being tangential and preferably provided with an involute deflector 16 adapted to direct the gases or vapors into the separator unit with a tangential whirling or vortical movement, the bottom of said deflector being inclined downwardly as shown in Fig. 3, so that, in conjunction with the inclined deflector 6, it operates to direct the incoming gas tangentially and obliquely downwardly into the separator element. An outlet means is provided within each separator element consisting of a tubular or hollow member 18 preferably frusto-conical with its smaller end directed downwardly and extending into the separator tube 14 from the upper end thereof and substantially coextensive with the height of the inlet opening 15; said outlet means 18 being mounted on any suitable support, as for example to the bottom plate 3' of the outlet header.

The series of elements 2 with their inlet means 15 are in contiguous relation so as to completely enclose the air inlet passage 8 and the conical deflector 6 is provided with extensions 6' inclined downwardly as prolongations of the conical surface of said deflector and projecting into the reentrant angles between adjacent portions 14 and terminating at the lower ends of the inlet passages 15, so that all gas admitted through passage 8 has to pass into the openings 15. The deflector member 6 may be mounted in the stated position by fusing its lower edge to the members 2, said members 2 being fused or welded at their upper ends to the edges of corresponding holes in top plate 13.

The lower end of each separator element 2 is preferably formed as a tapering member 19 open at its lower end as shown at 20 for discharge of separated material, said lower end of each separator element extending through the top plate 21 of the collecting means 4 aforesaid.

The collecting means 4 for receiving the separated material may consist of a hopper or funnel shaped member supported in any suitable manner below the outlets 20 of the separator elements and provided at its lower end with suitable gate means indicated at 22 for permitting discharge of the collecting material continuously or from time to time.

In case the material being treated is such as to tend to adhere more or less to the surfaces with which it is brought in contact, for example, in case the apparatus is applied to the collection of dried milk powder or material having similar characteristics, we prefer to mount the parts so that they may be opened up for cleaning. For this purpose the separator elements 2 and the plates 13 and 21 may be mounted on a swinging frame 25 which is supported by a hinge joint 26 on the main supporting frame 11 and is normally held in a raised position by spring catch means 28 engaging with a shoulder 29 on the said swinging frame. When the parts are in normal position as shown in drawings, the top plate 13 which is mounted on a swinging frame 25 and carries the separator elements 2, rests against a gasket 13' on the bottom plate 3' of the outlet header 3 so that the upper portions of the respective separator elements extend around the respective gas outlet means 18, the construction being preferably such as to provide a substantially gas-tight joint between the top plate 13 and the bottom plate 3' of the header 3.

It is also in some cases desirable to provide for opening up the receptacle 4 for the separated material and for this purpose said receptacle may be hinged at 30 to the swinging frame 25 aforesaid, and may be retained by a spring catch 31 so that a flange 33 on the collecting means 4 rests against a gasket 21' on the bottom of the top plate 21 aforesaid in such manner that the said plate 21 serves as a top or cover for the collecting member 4.

It will be seen that the above described construction permits the collecting member 4 to be swung down in position for cleaning and that the supporting frame 25 for the separator elements may also be swung down so that the interior of said separator elements may also be cleaned, the same operation giving access to the gas outlet means 18 which remain in fixed position when the separator tubes 2 are swung down with the supporting frame 25.

In some cases there is a tendency for the outlets 20 at the lower ends of the separator elements to become clogged, particularly if the material is of a more or less sticky nature and to prevent this we prefer in some cases to provide a gas outlet 35 as indicated leading from the collecting receptacle 4 to the gas or vapor conveying flues in such manner as to permit continual withdrawal of a portion of the gas or vapor from said collecting chamber, so as to insure continuous circulation of sufficient gas or vapor through the outlet openings 20 to carry all separated suspended material downwardly in the collecting chamber. As shown in Fig. 2, said gas outlet may advantageously be connected to the top of the receptacle 4, centrally inside the circular row of separator elements, thus providing uniform outflow of gas through the outlet openings 20 of all the separator elements. We prefer to connect the said conduit 35 with the gas conveying flue at a point preceding the connection of said flue to the inlet header 1, for example as shown in Figs. 5 and 6, the said conduit 35 may be connected to the inlet 36 of a fan or blower 37, said inlet being connected to receive the gas or vapor carrying suspended particles from any suitable source, and the outlet of the fan or blower 37 being connected by pipe 38 to the inlet member 1 of the separating apparatus. A controlling valve 39 may be interposed in the conduit 35 to regulate the rate of passage of gas or vapor so as to maintain clearance of the outlets 20 with the minimum flow of gas therethrough, and in case the parts are mounted so as to be swung down for cleaning as above described, said conduit 35 may include a flexible joint or portion, for example, a flexible hose indicated at 40 to permit of such operation.

It will, of course, be understood that the fan or blower required for maintaining the necessary pressure drop across the separating apparatus may either be connected in the inlet flue as shown, or it may be placed in the outlet flue so as to maintain a pressure below atmospheric within such apparatus, but in any case the circulation pipe 35 will be connected to a part of the gas conducting flues which is at a lower pressure than the dust receiving bin, for example, to the inlet of the fan.

The operation of the above described apparatus is as follows: The gas or vapor to be treated, consisting for example of the mixture of gas, vapor and suspended material coming from a milk evaporating plant and containing dried milk in the form of fine particles suspended in gas, is drawn from inlet 36 of fan or blower 37 and forced through pipe 38 to the inlet 1 of the separating apparatus. Passing downwardly through the inlet header 1, the gas and vapor are deflected outwardly by the conical deflector 6 and caused to pass through the opening 8 between the inlet header and the said conical deflector so as to be distributed uniformly to the circular series of separating members 2. The gas or vapor enters the separator tubes through the inlet opening 15 of each separator element and enters the separator element tangentially and at high velocity so as to impart a vertical movement to the body of gas or vapor within separator elements. By reason of this vortical or whirling motion the solid particles in the gas and vapor accumulate in a layer near the outside wall of the separator element and gradually descend by the action of the downward component of motion of the body of gas and vapor toward the bottom of the separator elements and are eventually discharged through the opening 20 thereof. As the gas enters the upper part of the separator element it receives not only a whirling motion around the outlet member 18, but also a downward component of motion, the gas stream passing downwardly in a more or less helical path in the portion of the separator element near or adjacent to the outer wall thereof and eventually rising in the central portion of said separator element so as to pass out through the outlet means 18.

By reason of the multiplicity of separator elements it is possible to make each separator element of relatively small diameter, thereby attaining a corresponding increase in effectiveness of the centrifugal action therein, inasmuch as the centrifugal force for a given velocity is an inverse function on the radius of curvature of the gas stream.

Not only is the centrifugal force factor increased for elements having small radii of curvature, but the maximum distance that a dust particle must travel before it encounters the walls of the element is decreased proportionately to the radius. As the distance to be traveled becomes smaller and the force factor inducing the travel becomes greater for elements having smaller radii of curvature, the efficiency in dust collection, especially for small particles, increases very rapidly with decreasing radius of curvature as shown by tests.

A multiplicity of small elements has been found advantageous in yet another direction compared to a single element handling the same gas volume. Dust collected against or adjacent the walls of the elements, especially fine powder, does not necessarily make actual contact with the walls, but is held in suspension in a film of air whirling at much lower velocity than the main body of air in the element. At any horizontal level in the element, the whirling of the gas causes a static pressure at the walls. As the body of air spirals away from the entrance, this whirling is decreased by friction against the walls, eddies, etc., so that the static pressure at the walls due to whirling, decreases with increasing distance from the entrance. The difference of static pressure at the walls causes downward pressure gradient resulting in active circulation of the air film carrying the dust in suspension towards the dust bin, into which the air film, together with a very heavy dust concentration is forcibly ejected. With small elements this forced circulation is especially vigorous, and sufficiently great that the walls of the elements remain polished and free from adhering dust even when collecting sticky powders. This forced circulation is so great compared to gravity that no effect upon the collecting efficiency can be noticed when the element is placed upside down with the dust bin at the top. With large elements having the same entering velocity of the gas stream, the forced circulation is so small that sticky powders adhere to the surface, change the character of the vortical motion within the element and greatly impair its efficiency.

With ordinary cyclones the forced circulation becomes so small on account of the relatively large diameter that there results a space in the bottom of the conical section that is usually referred to as a "dead air space" or "quiescent zone" in which the material tends to settle and collect, whereas with the construction above described, the separated material does not, in most cases, collect in the bottom of the separator element, but is forced through the outlet at the bottom of such element and is collected in the receptacle below, thereby providing for continuous operation and preventing any clogging of the outlet. The solid particles which are forced by the above described action toward the outer walls of the separator member, descend as stated to the outlet 20 and pass through such outlet to collecting means 4 from which the collected material may be withdrawn from time to time or continually as may be desired.

In some cases, particularly when the material being collected is of a sticky nature, as in the case of dried milk particles, it is desirable to provide for circulation of gas through the outlet 20, to ensure that no solid particles will lodge in the outlet and clog the same. By opening the valve 39 sufficient gas may be continuously withdrawn from the upper part of the collecting receptacle 4 to maintain a downward circulation of the gas through the outlets 20 aforesaid so as to prevent clogging of same by the separated material.

The provision for maintaining a positive outflow of a portion of the gas through the dust outlets 20 also has the additional function, when employed in conjunction with a plurality of cyclone tubes whose dust outlets discharge into a common receptacle, of substantially counteracting or minimizing any tendency for counterflow of gas between different tubes due to momentary differences in pressure between the dust outlet portions of said tubes. In the absence of any withdrawal of gas from the common receptacle, such momentary differences in pressure may in some cases cause gas to pass from one cyclone tube into said receptacle and then pass upwardly into another tube, and such gas would tend to carry separated solid material from the receptacle back up into said last-mentioned tube, and thus reduce the efficiency of dust removal. The expedient of maintaining a slight positive downflow of gas from all the tubes into the dust receptacle, however, serves to substantially eliminate loss of dust in this manner.

Our invention is not limited to the circular form of apparatus described above, but may also be used in connection with any other suitable form, for example, a rectangular form as shown in Figs. 7 to 11. In this form of the invention the inlet header 45 is mounted on a supporting frame 46 and is formed as a tubular conduit, opening at its lower end into a distribution chamber 47, the bottom of which is formed with a wedge shaped portion 49 extending upwardly in the path of the gas descending from the inlet means 45. The separator elements 50 are in this case arranged in two rows, one row at each side of the deflecting means 49, the function of said deflector being to divide the gas stream and to distribute it to either side to the two rows of separator members in a uniform manner. The separator members 50 on each side are contiguous, so as to form a confining wall at each side of the distribution chamber 47 and each separator member 50 is provided with a tangential inlet passage 51 opening into the distribution chamber 47. Said inlets 51 may be provided with involute deflectors 52 as shown in Figs. 7 and 10 so as to cause the gas to enter each separator member in a tangential manner. The wedge shaped or inverted V-shaped bottom plate 49 for the distribution chamber 47 has extensions 49′ extending between adjacent separator members 50 and meeting the lower edges of inlet 51 for said members.

An outlet header 53 surrounds the inlet header 45 and a plurality of tubular outlet means 55 extend downwardly from the bottom plate 54 of said outlet header and within the upper ends of the respective separator elements 50 said tubular members extending preferably to about the same vertical height as the inlets 51 for the respective separator elements. It will be noted in this case we have shown each separator element as comprising an upper portion 56 surrounding the outlet means 55 and a body portion 57 extending downwardly from the said upper portion and formed as a cylindrical tube provided at its lower end with a contracted frusto-conical outlet portion 58 having openings 59 leading to material collecting means or hopper 60. Said material collecting means may have a discharge outlet 61 provided with any suitable gate or other means for withdrawal of material therefrom.

The operation of this form of the invention is similar to that above described except that the gas being treated and entering the apparatus in a vertically descending stream is divided by the deflector means 49 into two streams passing respectively to the inlets of the two rows of separator elements.

In both forms of the invention shown, the inlet openings (as shown in Figs. 3 and 9) for the respective separator elements, are provided with deflectors having downwardly inclined bottoms and in conjunction with the inclined deflectors shown at 6 in Fig. 2 or at 49 in Fig. 11, constitute inlet means extending tangentially and obliquely downward into the upper part of the respective separator elements. This construction is advantageous as the gas is thereby caused to enter the separator element with a downward component of motion as well as a tangential component, both of these motions being necessarily components of the helical or vortical motion of the gas within the separator.

It will be seen that the principal features illustrated in the several forms of apparatus above described include, first, the central inlet header through which the gas to be treated passes downwardly and the means for spreading the gas outwardly from said header into the inlet openings of the several separator elements; second, the assembly of the upper header, separator elements, and material receptacle in such manner that the same may be readily opened up for inspection and cleaning; and third, the provision of means for insuring sufficient downward flow of gas through the material outlets at the bottom of the separator elements to keep said outlets clean at all times. It is to be understood that it is not essential that all of these features be used in conjunction with one another, and that any one of them may be advantageously embodied in centrifugal separating apparatus of the same general type, independently of the others.

We claim:

1. A centrifugal separator for removing suspended material from gases comprising an inlet header provided with inlet means, a plurality of separator elements arranged at the sides of said inlet header and having tangential inlets opening into said inlet header, each separator element comprising a tubular member having its said inlet at one end and having an outlet for separated material at its other end and provided with a tubular gas outlet means extending adjacent said tangential inlet, deflector means disposed in the path of the gas entering said inlet header from the inlet means thereof and adapted to deflect such gas into the inlets to the respective separator elements and an outlet header surrounding said inlet header and communicating with the said tubular outlet means for the respective separator elements.

2. An apparatus for separating suspended material from gases comprising a supporting frame, an inlet header mounted on said frame, a swinging frame hinged on the aforesaid frame to swing vertically thereon, separator means carried by said swinging frame and provided at their upper ends with inlet openings adapted to communicate with said inlet header when said swinging frame is in raised position and at their lower ends with outlets for separated material, and means for retaining said swinging frame and separator means in raised position.

3. A construction as set forth in claim 2 and comprising in addition, a material receptable hingedly mounted on said swinging frame and means for releasably retaining said material receptacle in raised position, said material receptacle when in such raised position extending under the outlets of said separator means to receive the material therefrom.

4. An apparatus for separating suspended material from gases comprising a supporting frame, an inlet header mounted thereon, an outlet header also mounted on said frame adjacent said inlet header and provided with outlet openings, a swinging frame hingedly mounted on said supporting frame to swing vertically thereon, means for retaining said swinging frame in raised position and separator means mounted on said swinging frame and provided with inlet means communicating with said inlet header when said swinging frame is in raised position, said separator means also communicating with said outlet openings of the outlet header when said swinging frame is in raised position for delivery of gas to the outlet header.

5. An apparatus for separating suspended material from gases comprising a supporting frame, an inlet header mounted on said frame, an outlet header mounted on said frame and surrounding said inlet header and provided with a plurality of outlet means in its bottom, a swinging frame hinged on said supporting frame to swing vertically thereon, means for retaining said swinging frame in raised position and a plurality of separator elements mounted on said swinging frame and provided with inlet openings communicating with said inlet header when said swinging frame is in raised position, said separator elements communicating with the respective outlet means in the outlet header when the swinging frame is in raised position to provide for discharge of gas from the separator elements and said separator elements being provided at the bottom thereof with means for discharge of separated material, and means mounted on said swinging frame making a gas tight connection with the bottom of said outer header when the swinging frame is in raised position, to cause deflection of all of the gas from the inlet header into the inlet openings of the separator elements.

6. A centrifugal separator for removing suspended material from gases comprising an inlet header disposed about an axis, a plurality of separator elements disposed in a circular row around the axis of said inlet header and having their upper portions in contiguous relation so as to completely inclose said inlet header, each separator element comprising an elongated tubular member of circular cross-section having a substantially tangential inlet opening at its said upper portion communicating with said inlet header and a centrally disposed outlet opening for separated material at its lower end and also provided with a centrally disposed tubular gas outlet means at its upper end, and conical deflector means disposed concentrically within said inlet header and having downwardly inclined extensions projecting into the spaces between the upper end portions of adjacent separator elements and terminating at the lower edges of said tangential inlet openings so as to deflect gas uniformly from said inlet header through said inlet openings with a downward component and substantially tangentially with respect to the separator elements.

7. A centrifugal separator for removing suspended material from gases comprising an inlet header disposed about an axis, a plurality of separator elements disposed in a circular row around the axis of said inlet header and having their upper portions in contiguous relation so as to completely inclose said inlet header, each separator element comprising an elongated tubular member of circular cross-section having a substantially tangential inlet opening at its said upper portion communicating with said inlet header, and a centrally disposed outlet opening for separated material at its lower end and also provided with a centrally disposed tubular gas outlet means at its upper end, deflector means disposed within said inlet header for deflecting gas uniformly from said inlet header to said tangential inlet openings of all said separator elements, a receptacle for separated material communicating with said material outlet openings at the lower ends of all of said separator elements, a gas outlet communicating with the top of said material receptacle centrally within the circular row of separator elements, and means for withdrawing gas from said material receptacle through said gas outlet.

GEORGE H. HORNE.
MARCEL A. LISSMAN.